(No Model.) 2 Sheets—Sheet 1.
H. M. STEINTHAL.
MACHINE FOR STRIPPING DRIED PLASTIC MATERIAL FROM PLATES OR PADS.

No. 420,633. Patented Feb. 4, 1890.

WITNESSES.
John Becker
C. K. Fraser.

INVENTOR.
Henry Michael Steinthal,
By his Attorneys, A. C. Fraser & Co.

(No Model.) 2 Sheets—Sheet 2.

H. M. STEINTHAL.
MACHINE FOR STRIPPING DRIED PLASTIC MATERIAL FROM PLATES OR PADS.

No. 420,633. Patented Feb. 4, 1890.

WITNESSES.
John Becker
C. K. Fraser.

INVENTOR.
Henry Michael Steinthal,
By his Attorneys,
A. C. Fraser & Co.

UNITED STATES PATENT OFFICE.

HENRY MICHAEL STEINTHAL, OF SCARBOROUGH, COUNTY OF YORK, ENGLAND.

MACHINE FOR STRIPPING DRIED PLASTIC MATERIAL FROM PLATES OR PADS.

SPECIFICATION forming part of Letters Patent No. 420,633, dated February 4, 1890.

Application filed July 5, 1889. Serial No. 316,596. (No model.)

*To all whom it may concern:*

Be it known that I, HENRY MICHAEL STEIN-THAL, floor-cloth manufacturer, a subject of the Queen of Great Britain, residing at Scarborough, in the county of York, England, have invented certain new and useful Improvements in Machines for Stripping Dried Plastic Material from Plates or Pads, of which the following is a specification.

My invention consists of a machine for stripping dried plastic material from plates or pads, and has been specially designed for stripping layers or sheets of paint composition from plates or pads upon which they have been spread to dry, in order that they may be subsequently employed in the manufacture of floor-cloths, wall coverings, or other like purposes.

My machine consists, essentially, of, first, a revolving cylinder against which the plates to be stripped are applied singly; second, of gripper or clip bars, which revolve with the cylinder and take hold of the successive plates and carry them round; third, of a curved guide or guides for the plates to rest on while being carried round by the gripper or clip bars; fourth, of a knife or stripper for removing the material from the plates as they are being carried round, and, fifth, of a traveling band to receive and carry away the material as it is stripped off.

Having explained the nature and main features of the machine, I will proceed to describe more in detail the manner in which it can be constructed, and for this purpose will refer to the accompanying drawings of a machine in in which my invention is embodied.

Figure 1:
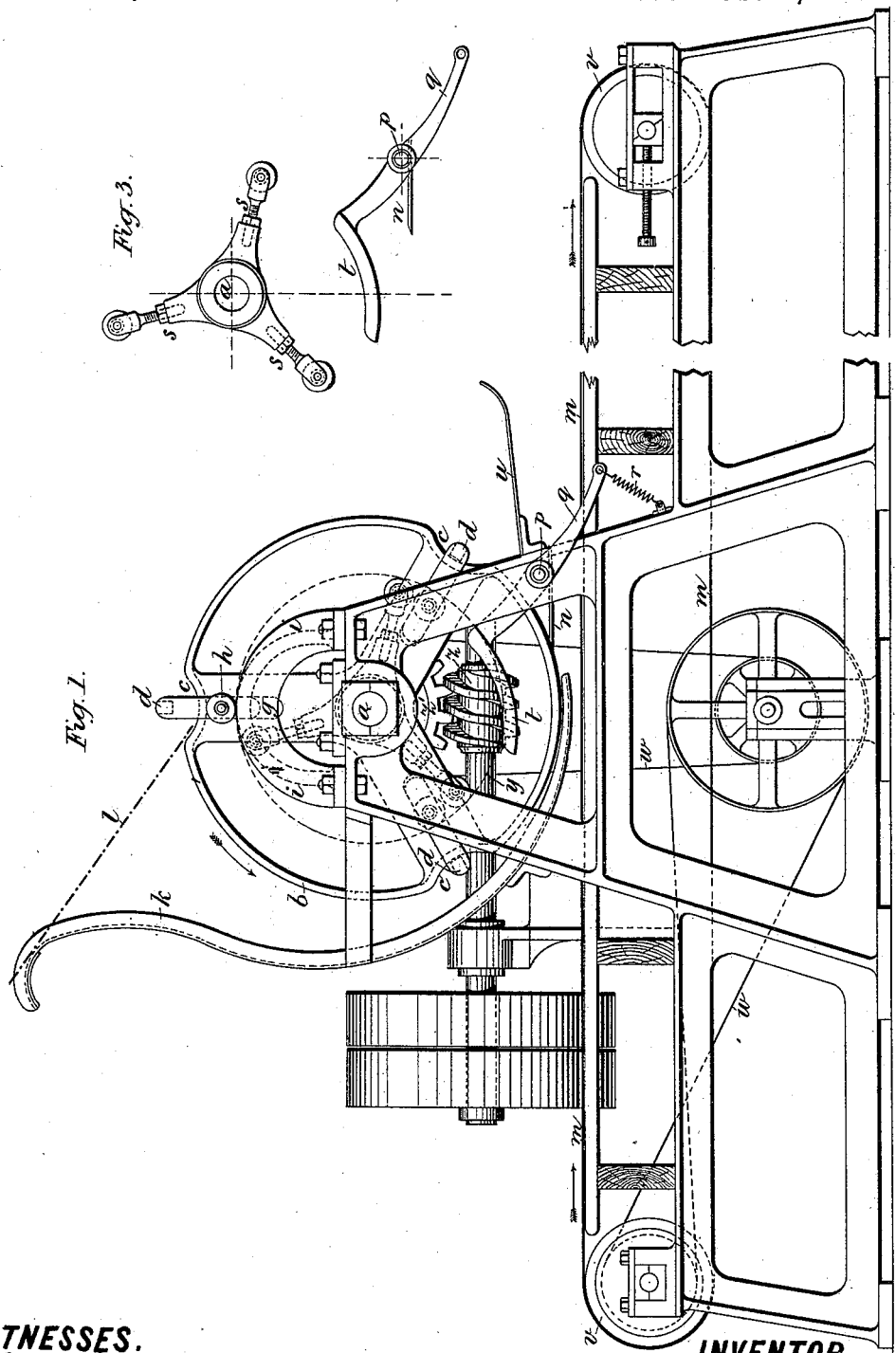
Figure 2:
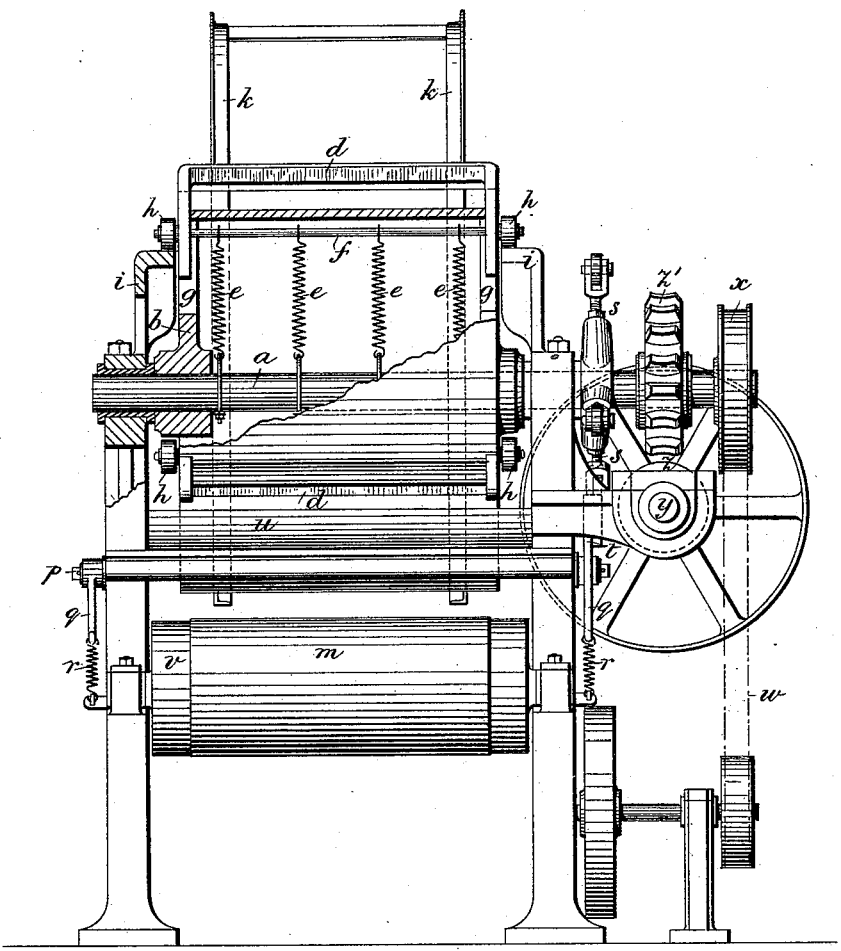

Figure 1 is a side elevation of the machine, and Fig. 2 an end view partly in section. Fig. 3 is a detail view showing the stripping-knife and its carrier and the rotating arms which operate it, as hereinafter described.

In suitable bearings I mount the shaft $a$ of a rotating horizontal cylinder or drum $b$. In the periphery of this cylinder are transverse recesses $c\ c$, extending the whole length of the same and arranged at equal distances apart. In the machine shown there are three of these recesses; but the number is optional. In each recess $c$ is a gripper or clip bar $d$, which is fitted with springs $e\ e$, tending to pull it inward. These springs are shown as attached at the one end to a rod or bar $f$, that connects the two ends of the clip-bar, and at the other end to the cylinder-shaft $a$. The bar $f$ and the ends of clip-bar move in guides $g\ g$ in the cylinder ends. Outside the cylinder $b$ the gripper or clip bar $d$ has at each end a roller $h$ to run over a cam or curved guide $i$, fixed to the machine-frame, which at a certain point of the revolution of the cylinder forces the gripper or clip bar outward, as will be seen on reference to the top bar $d$ in the figures, the springs $e\ e$ being thereby stretched. At this point—that is to say, when the bar $d$ is forced outward—tabs or loops attached to the end of the plate to be stripped are inserted under the bar $d$, so that the bar, when it has passed the cam $i$, shall, on being pulled in again by its springs $e\ e$, grip or clip the plate by its tabs and carry it round. Facing the cylinder is a curved guide $k$, against which the sides of the plate, which is indicated in dots at $l$, rest while moving round with the cylinder. This guide $k$ prevents the plates falling upon the traveling band $m$ below.

Underneath and in contact with the cylinder $b$ is a knife or stripper $n$. It is carried by a horizontal spindle $p$, to which are attached arms $q\ q$, held down by springs $r\ r$, which tend to keep the knife raised; but at the proper time the knife is moved downward, so as to let the front end of the plate pass it. This downward movement is effected by means of one of the rotating arms $s\ s\ s$, mounted on and rotating with the cylinder-shaft $a$. The arm comes in contact with and forces down the lever $t$, carried by the spindle $p$, and thereby depresses the knife. As soon as the arm $s$ has passed the lever $t$ the knife is immediately raised by the springs $r\ r$, so as to bear against the face of the plate upon a part thereof near the end not covered by the material. Consequently as the plate continues to move round with the cylinder $b$ the knife $n$, bearing as it does upon the covered face of the plate, strips the plastic material therefrom. Below the cylinder is the traveling band $m$, which receives the stripped sheet and carries it away, while the bare plate is carried farther round with the cylinder $b$ and is released when the gripper or clip bar $d$ that holds it is moved outward at the next action of the cam $i$. The plates on being released fall upon a receiver or guard $u$, which prevents their reaching the traveling band $m$. The band $m$ passes round rollers $v\ v$ at the two ends of the machine, the shaft of one of these rollers being driven by belt-gearing $w\ w$ from a pulley $x$ on the cylinder-shaft $a$. The shaft $a$ in the arrangement shown derives its motion from the driving-shaft $y$ by a worm $z$ and worm-wheel $z'$; but it is evident that any other suitable arrangement for imparting motion to the machine can be adopted. The material stripped off the plates will not, as a rule, be received by the traveling band $m$ itself, but by trays fed continuously to the band at one end of the machine and removed at the other end.

What I claim, and desire to secure by Letters Patent, is—

1. A machine for stripping dried plastic material from plates or pads, comprising a revolving cylinder against which the plates to be stripped are to be applied singly, gripper or clip bars revolving with said cylinder to take hold of the successive plates and carry them round, a curved guide for the plates to rest on while being carried round, a knife or stripper for removing the material from the plates as they are being carried round, and a traveling band to receive and carry away the material as it is stripped off, substantially as set forth.

2. The combination, with the revolving cylinder $b$, gripper or clip bars $d\ d$, revolving with said cylinder, guide $k$, pivoted knife or stripper $n$, and traveling band $m$, of a fixed cam or curved guide $i$, for forcing said gripper or clip bars outward, and springs $e\ e$, for drawing said bars inward, substantially as set forth.

3. The combination, with the revolving cylinder $b$, gripper or clip bars $d\ d$, revolving with said cylinder, guide $k$, pivoted knife or stripper $n$, and traveling band $m$, of the rotating arms $s\ s\ s$, for depressing the knife, and the springs $r\ r$, for again raising it, substantially as set forth.

4. The combination, with the revolving cylinder $b$, gripper or clip bars $d\ d$, revolving with said cylinder, guide $k$, pivoted knife or stripper $n$, and traveling band $m$, of the receiver or guard $u$ to receive the stripped plates when released by the bars $d\ d$, substantially as set forth.

5. In a machine for stripping dried plastic material from plates or pads, the combination of the following devices, constructed and operating as and for the purposes set forth, viz: the revolving cylinder $b$, the gripper or clip bars $d\ d$, revolving with said cylinder, the fixed cam $i$, the springs $e\ e$, the guide $k$, the pivoted knife or stripper $n$, the springs $r\ r$, the rotating arms $s\ s\ s$, the traveling band $m$, and the receiver or guard $u$.

In witness whereof I have hereunto signed my name in the presence of two subscribing witnesses.

HENRY MICHAEL STEINTHAL.

Witnesses:
CHARLES STEWART WARDELL,
ARTHUR SLEIGHTHOLM.